(12) United States Patent
Howard et al.

(10) Patent No.: US 7,594,623 B2
(45) Date of Patent: Sep. 29, 2009

(54) TORSIONALLY DE-COUPLED ENGINE MOUNT SYSTEM

(75) Inventors: John V. Howard, Arlington, TX (US); Stephen E. Mildenstein, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 450 days.

(21) Appl. No.: 10/528,213

(22) PCT Filed: Sep. 17, 2002

(86) PCT No.: PCT/US02/29509

§ 371 (c)(1),
(2), (4) Date: Nov. 7, 2005

(87) PCT Pub. No.: WO2004/026689

PCT Pub. Date: Apr. 1, 2004

(65) Prior Publication Data

US 2006/0151665 A1    Jul. 13, 2006

(51) Int. Cl.
*B64D 27/00* (2006.01)
(52) U.S. Cl. .................................... 244/54
(58) Field of Classification Search .............. 244/54, 244/17.11, 7 R, 17.23
See application file for complete search history.

(56) References Cited

U.S. PATENT DOCUMENTS

| 2,718,756 | A | * | 9/1955 | McDowall ............. 60/797 |
| 3,288,404 | A |   | 11/1966 | Schmidt et al. |
| 3,439,888 | A | * | 4/1969 | Dancik ................. 244/56 |
| 3,836,100 | A |   | 9/1974 | Von Hardenberg et al. |
| 4,274,510 | A |   | 6/1981 | Mouille et al. |
| 4,829,850 | A |   | 5/1989 | Soloy |
| 5,806,792 | A |   | 9/1998 | Brossier et al. |
| 5,871,177 | A | * | 2/1999 | Demouzon et al. ............. 244/54 |
| 5,873,547 | A |   | 2/1999 | Dunstan |
| 6,059,227 | A |   | 5/2000 | Le Blaye et al. |
| 6,095,456 | A | * | 8/2000 | Powell ......................... 244/54 |
| 6,260,800 | B1 |   | 7/2001 | Snell |
| 6,398,161 | B1 |   | 6/2002 | Jule et al. |

FOREIGN PATENT DOCUMENTS

GB           998108          7/1965

OTHER PUBLICATIONS

Int'l Search Report PCT/US02/12881, Mar. 24, 2003.
EPO Search Report, Oct. 27, 2005.
Sonneborn, W. G., et al., "V-22 Propulsion System Design," Seventeenth European Rotorcraft Forum, Sep. 24-27, 1991, Paper No. 91-25, Berlin, Gernany.

(Continued)

*Primary Examiner*—Tien Dinh
(74) *Attorney, Agent, or Firm*—James E. Walton

(57) ABSTRACT

A torsionally de-coupled engine mount system (13) for use in tilt rotor aircraft (11) applications is disclosed, in which an engine is mounted at its forward end to a prop rotor gear box by means of a forward mount (303) that is a simple adapter fitting, and at its aft end to a pylon assembly by an aft mount (305) that is a simple bi-pod fitting. The forward mount (303) counteracts forces and moments in six degrees of freedom, but the aft mount (305) only counteracts lateral and vertical loads. The contribution from the engine to the overall dynamic response of the aircraft is tuned by selectively tailoring the size, shape, weight, and material of the forward mount (303). The engine mount system torsionally de-couples the engines from the prop rotors, thereby preventing rotor torque from being induced into the engines. In addition, the contribution from the engines to the overall dynamic response of the aircraft can be tuned by selectively tailoring the size, shape, weight, and material of the forward mounts between the engines and the transmissions.

5 Claims, 9 Drawing Sheets

OTHER PUBLICATIONS

Smailys, H., et al., "Advanced Technologies Applied to PT6C-67A Tiltrotor Engine Design," American Helicopter Society 57th Annual Forum, May 9-11, 2001, Washington, DC.

Duello, Charles, "BA609 Tiltrotor Drive System," American Helicopter Society 58th Annual Forum, Jun. 11-13, 2002, Montreal, Canada.

* cited by examiner

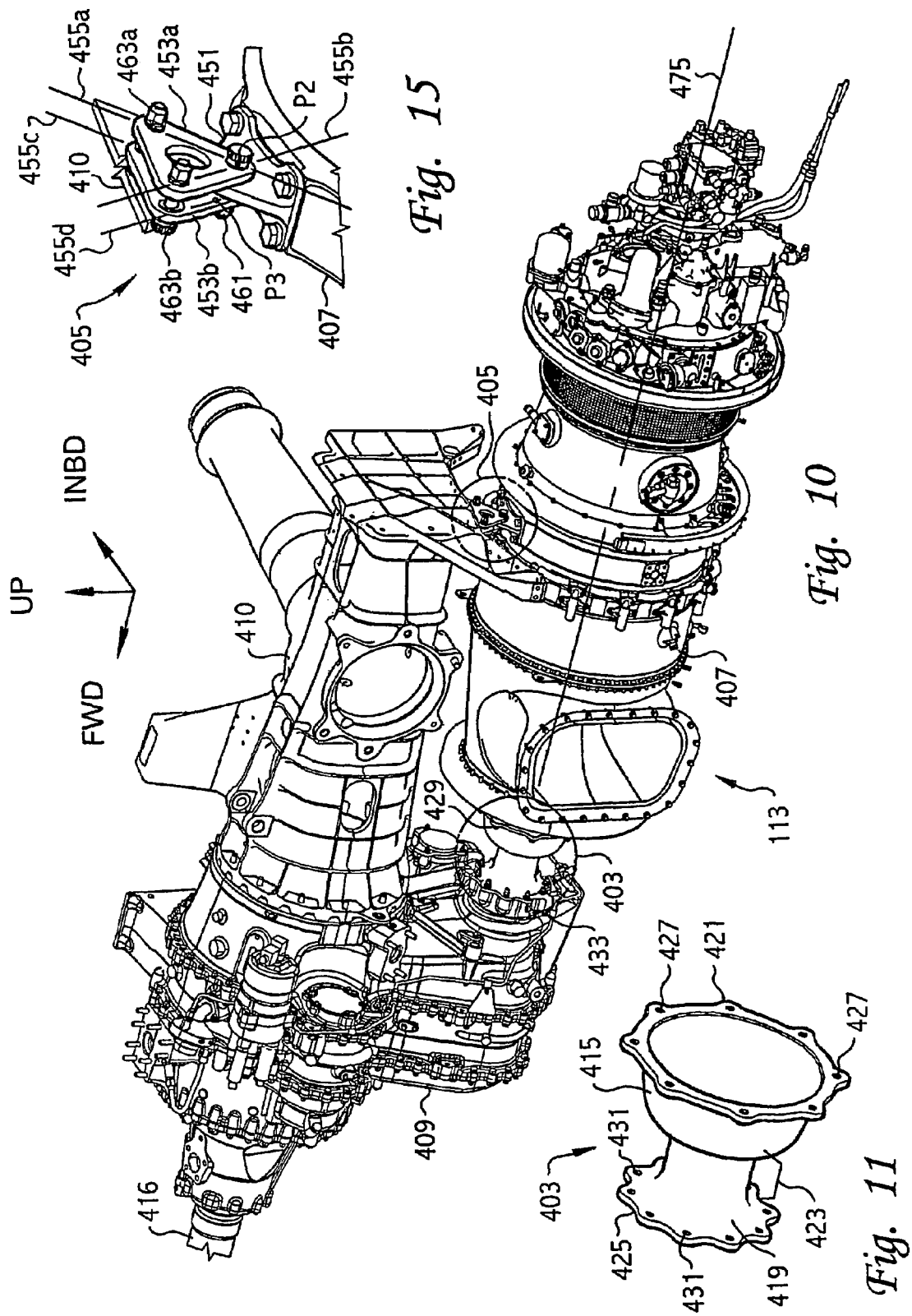

ENGINE WITH TORSIONALLY REDUNDANT AFT MOUNT.

NOTE SIDESWAY DUE TO GEARBOX WINDUP PLUS TWISTING OF ENGINE

ENGINE WITH BIPOD AFT MOUNT.

NOTE SIDESWAY DUE TO GEARBOX WINDUP BUT NO ENGINE TWIST, JUST ROTATION

TORSIONALLY DE-COUPLED ENGINE MOUNT SYSTEM

TECHNICAL FIELD

The present invention relates to systems for mounting engines in aircraft. In particular, the present invention relates to systems for mounting engines in tilt rotor aircraft.

DESCRIPTION OF THE PRIOR ART

Tilt rotor aircraft are unique in that they have tilt rotor assemblies that operate between a helicopter mode in which the tilt rotor assemblies are rotated upward allowing the tilt rotor aircraft to take off, hover, fly, and land like a conventional helicopter; and an airplane mode, in which the tilt rotor assemblies are tilted forward allowing the tilt rotor aircraft to fly like a conventional fixed-wing propeller driven aircraft. The first tilt rotor aircraft were designed strictly for military or research purposes, but now plans are being made to manufacture civilian-type tilt rotor aircraft.

Aside from the vast differences between tilt rotor aircraft and conventional helicopters and propeller driven aircraft, there are significant differences between military-type tilt rotor aircraft and civilian-type tilt rotor aircraft. Often a design that is necessary in a military-type application is not commercially feasible in a civilian-type application. For example, certain factors, such as weight, passenger comfort, safety, and cost, must be carefully considered if a civilian-type tilt rotor aircraft program is to be successful. In addition, civilian-type tilt rotor aircraft will have to comply with a considerable amount of governmental regulation. Certain additional design considerations must be made to accommodate the civilian tilt rotor aircraft market.

Although tilt rotor aircraft provide many unique advantages, they also present many unique challenges. One such challenge involves the mounting of the engines to the transmissions and other components in the aircraft. Because the engines in tilt rotor aircraft are mounted to pylons and transmissions located at the ends of the wings in a manner that allows rotation relative to the wings, engine mounting techniques used in conventional helicopters and propeller driven aircraft are not adequate.

In tilt rotor aircraft, the engines and transmissions are mounted in nacelles that rotate relative to the wings of the aircraft. The rotors, transmissions, and engines are carried by pylon assemblies within the nacelles that rotate about spindles that are installed into the outboard ends of the wing members. The transmissions, also referred to as prop rotor gear boxes, are coupled to the forward ends of the pylon assemblies, and the engines are disposed beneath the pylon assemblies. The engines are coupled to the transmissions and pylons by engine mounting systems. The engine mounting systems perform several functions: they hold and support the engine in the aircraft; they counteract the torque applied to the transmission by the engine input shaft; and they play a critical role in determining the contribution of the engine to the overall dynamic response of the aircraft.

In early designs, the engine was attached by an engine mount directly to the prop rotor gear box so that the engine extended back from the prop rotor gear box in a cantilevered fashion and hung generally parallel to and below the pylon assembly. However, it was quickly determined that support of the aft end of the engine was necessary. This was done initially with a single rigid link connected to the pylon. In later designs, the engine was attached to the prop rotor gear box by a gimbal assembly and supported at the aft end by multiple rigid links. One of the links was later modified to include a tuning means which could be used to counteract primarily lateral loads and to tune the dynamic response of the engine.

Although these changes in the engine mounting system solved the problems associated with the engines being cantilevered from the prop rotor gear boxes, they introduced other problems. Most significantly, coupling the engine to both the prop rotor gear box and the pylon assembly created a mechanical loop through which torque from the main rotor could be induced into the engine at the prop rotor gear box and reacted near the aft end of the engine into the pylon. Thus, the introduction of multiple rigid links coupled near the aft end of the engine created torsional redundancy in the engine. In other words, these prior-art techniques unnecessarily allowed a portion of the rotor torque to be induced into the engine-pylon loop.

The foregoing represents great strides in the design and manufacture of tilt rotor aircraft; however, many challenges remain, particularly in the area of engine mounting systems.

SUMMARY OF THE INVENTION

There is a need for an engine mount system for tilt rotor aircraft in which the engines are torsionally de-coupled so that no portion of the rotor torque can be induced into the engine-pylon loop, and in which the contribution from the engines to the overall dynamic response of the aircraft can be tuned by selectively tailoring the size, shape, weight, and material of the couplings between the engines and the prop rotor gear boxes.

Therefore, it is an object of the present invention to provide a torsionally de-coupled engine mount system for tilt rotor aircraft applications in which the engines are torsionally de-coupled so that no portion of the rotor torque can be induced into the engine-pylon loop.

It is another object of the present invention to provide a torsionally de-coupled engine mount system for tilt rotor aircraft applications in which the contribution from the engines to the overall dynamic response of the aircraft is tuned by selectively tailoring the size, shape, weight, and material of the couplings between the engines and the prop rotor gear boxes.

The above objects are achieved by providing a torsionally de-coupled engine mount system for use in tilt rotor aircraft applications, in which the engines are mounted at their forward ends to prop rotor gear boxes by means of simple adapter fittings and at their aft ends to pylon assemblies by means of simple focused bi-pods, or delta, fittings. The forward mounts counteract forces and moments in six degrees of freedom, but the aft mounts counteract only lateral and vertical forces from the pylon assemblies. In the preferred embodiment, the contribution from the engines to the overall dynamic response of the aircraft is tuned by selectively tailoring the size, shape, weight, and material of the forward mounts, which are chalice-shaped. In this manner, the engines are torsionally de-coupled so that no portion of the rotor torque can be induced into the engine-pylon loop, while providing stiff engine mounts that are tunable.

The torsionally de-coupled engine mount system of the present invention provides significant advantages. Loads in the engine mounts are significantly reduced. This allows the use of fewer parts that are less complicated and that weight less. This leads to commensurate cost and weight savings. For example, weight and cost of the system in the military-type tilt rotor aircraft application can be reduced by over 65%. The engine and pylon assembly can also be lighter, because with the present invention these components do have to be designed for high induced torque from the rotors. Dynamic analysis and tuning of the system is facilitated by simple structure and load paths. Dynamic and static problems are diminished by the significant reduction in system complexity. The system eliminates the need for highly loaded gimbal mounts and multiple link attachments.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

FIG. 10 is a perspective view of the torsionally de-coupled engine mount system of the civilian-type tilt rotor aircraft of FIG. 2;

FIG. 11 is a perspective view of the forward mount of the engine mount system of FIG. 10;

FIG. 15 is an enlarged perspective view of the aft mount of the engine mount system of FIG. 10.

DESCRIPTION OF THE PREFERRED EMBODIMENT

Figure 1:
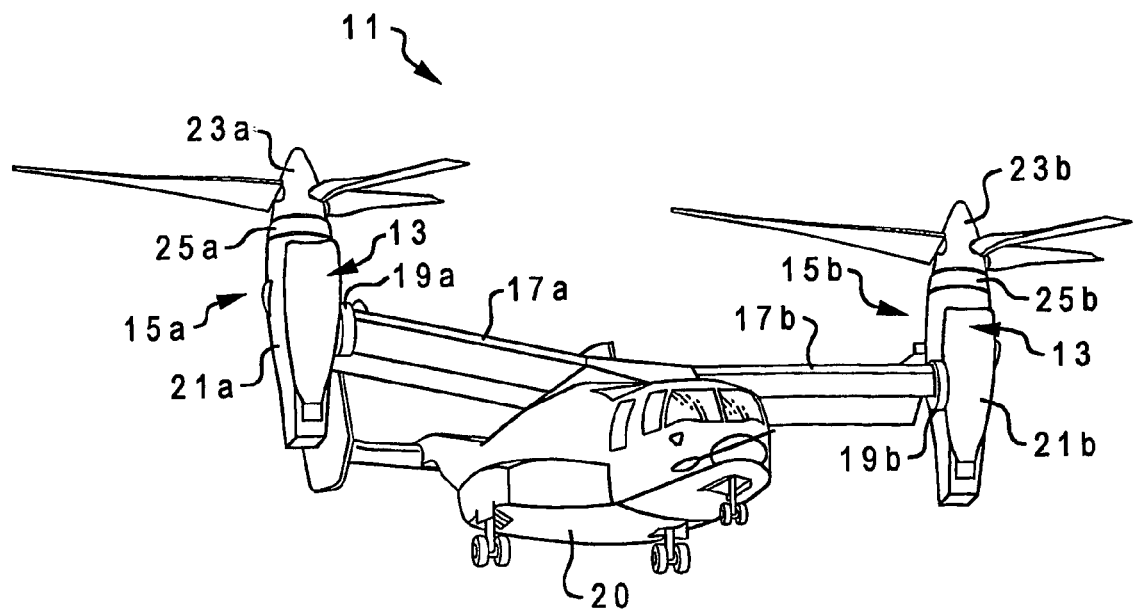
FIG. 1 is a perspective view of a military-type tilt rotor aircraft having a torsionally de-coupled engine mount system according to the present invention.

Referring to FIG. 1 in the drawings, a military-type tilt rotor aircraft 11 having a torsionally de-coupled engine mount system 13 according to the present invention is illustrated. Tilt rotor assemblies 15a and 15b are carried by wing members 17a and 17b, and are disposed at end portions 19a and 19b of wing members 17a and 17b, respectively. Wing members 17a and 17b are coupled to a fuselage 20. Tilt rotor assemblies 15a and 15b include nacelles 21a and 21b, which house the engines, transmissions, and prop rotor gear boxes that drive rotors 23a and 23b disposed on forward ends 25a and 25b of nacelles 21a and 21b.

Tilt rotor assemblies 15a and 15b move or rotate relative to wing members 17a and 17b between a helicopter mode in which tilt rotor assemblies 15a and 15b are tilted upward, such that tilt rotor aircraft 11 can take off, hover, fly, and land like a conventional helicopter; and an airplane mode in which tilt rotor assemblies 15a and 15b are tilted forward, such that tilt rotor aircraft 11 flies like a conventional fixed-wing propeller driven aircraft. In FIG. 1, tilt rotor aircraft 11 is shown in the helicopter mode.

Figure 2:
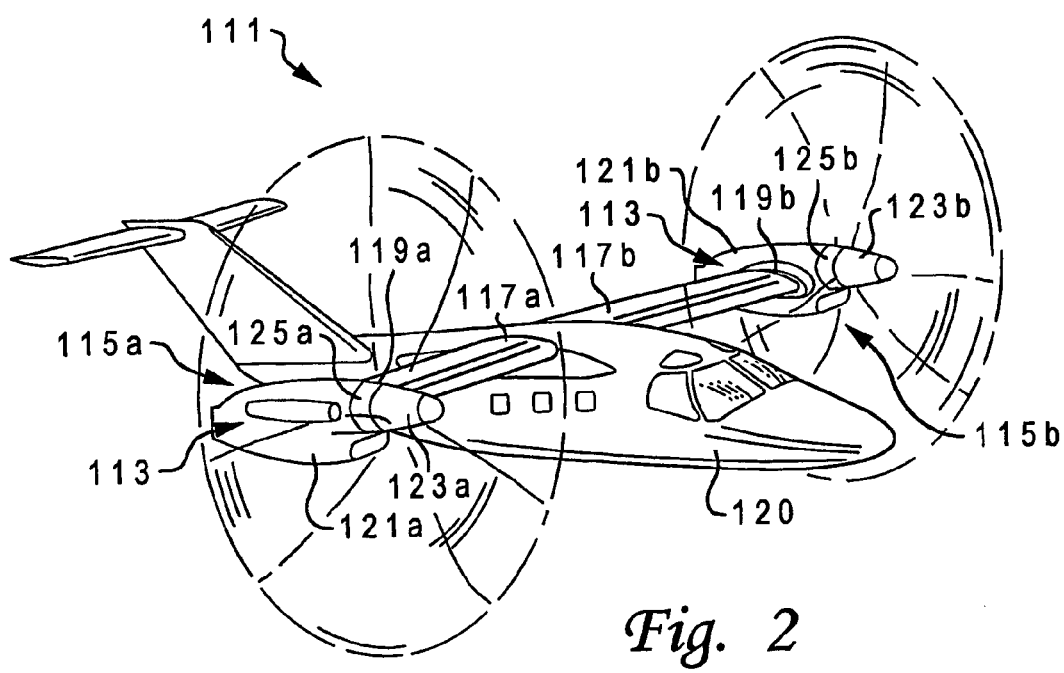
FIG. 2 is a perspective view of a civilian-type tilt rotor aircraft having a torsionally de-coupled engine mount system according to the present invention.

Referring now to FIG. 2 in the drawings, a civilian-type tilt rotor aircraft 111 having a torsionally de-coupled engine mount system 113 according to the present invention is illustrated. Tilt rotor assemblies 115a and 115b are carried by wing members 117a and 117b, and are disposed at end portions 119a and 119b of wing members 117a and 117b, respectively. Wing members 117a and 117b are coupled to a fuselage 120. Tilt rotor assemblies 115a and 115b include nacelles 121a and 121b, which house the engines, transmissions, and prop rotor gear boxes that drive rotors 123a and 123b disposed on forward ends 125a and 125b of nacelles 121a and 121b.

Tilt rotor assemblies 115a and 115b move or rotate relative to wing members 117a and 117b between a helicopter mode in which tilt rotor assemblies 115a and 115b are tilted upward, such that tilt rotor aircraft 111 can take off, hover, fly, and land like a conventional helicopter; and an airplane mode in which tilt rotor assemblies 115a and 115b are tilted forward, such that tilt rotor aircraft 111 flies like a conventional fixed-wing propeller driven aircraft. In FIG. 2, tilt rotor aircraft 111 is shown in the airplane mode.

Figure 3:
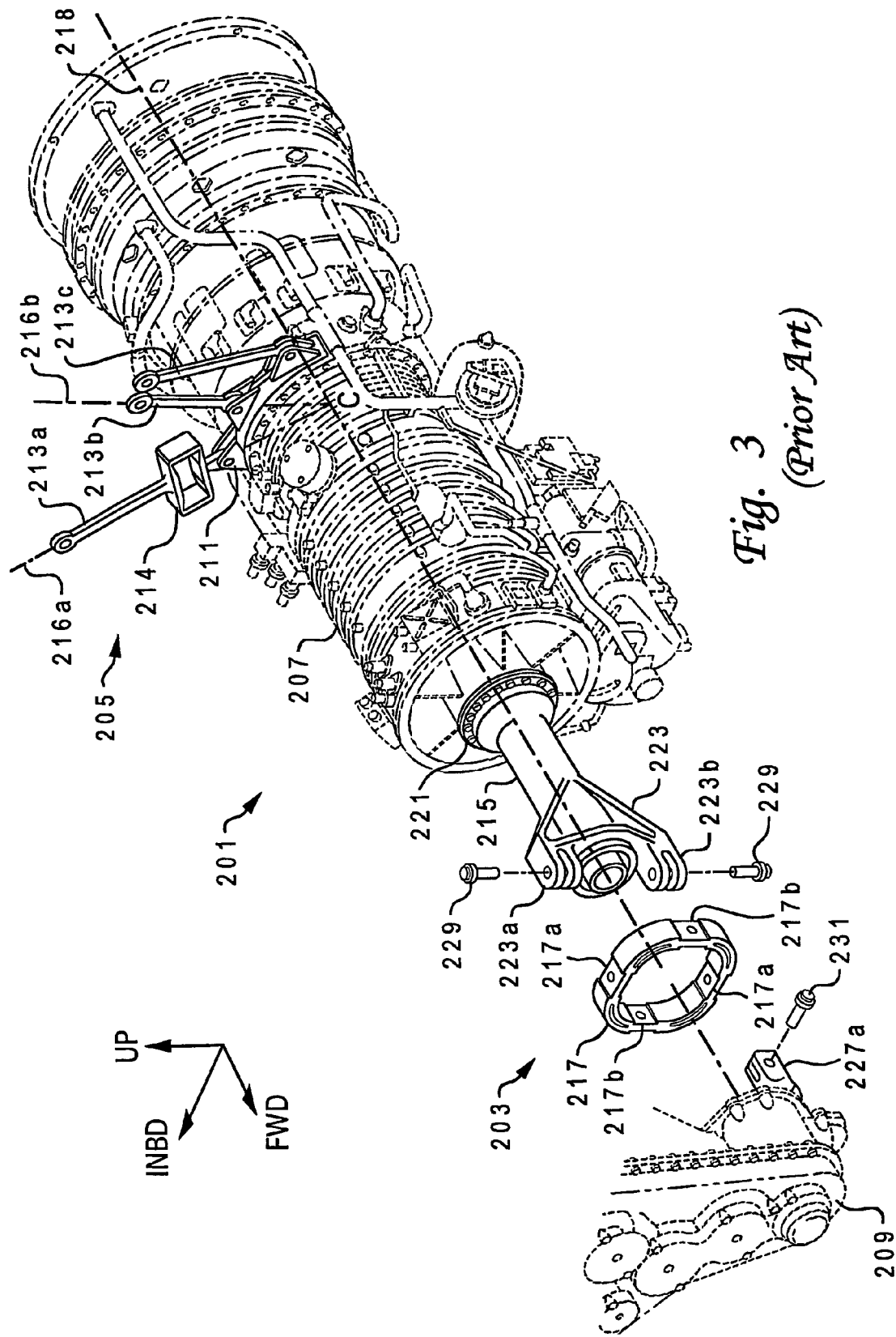
FIG. 3 is a partially exploded perspective view of a prior-art engine mount system for use on military-type tilt rotor aircraft similar to the aircraft of FIG. 1.

Referring now to FIG. 3 in the drawings, a prior-art engine mount system 201, as would be used on the left side of a military-type tilt rotor aircraft similar to the military-type aircraft of FIG. 1, is illustrated. Prior-art engine mount system 201 includes a forward mount 203 and an aft mount 205. Forward mount 203 is coupled between an engine 207 and a prop rotor gear box 209. Aft mount 205 is coupled between engine 207 and a pylon assembly (not shown, but similar to pylon assembly 410 in FIG. 9) disposed within a nacelle (not shown, but similar to nacelle 21b). A mechanical loop is formed by coupling the forward end of engine 207 to prop rotor gear box 209, by coupling prop rotor gear box 209 to the pylon assembly, and by coupling the pylon assembly to the aft end of engine 207. This mechanical loop is the means by which torque from the rotor (not shown, but similar to rotor 23b), also referred to as wind-up torque, is induced back into engine 207.

Aft mount 205 is typically made of stainless steel and includes a mounting bracket 211 coupled to engine 207, and three links 213a, 213b, and 213c, each pivotally coupled between mounting bracket 211 and the pylon assembly. Link 213a includes a tuning means 214 to reduce the excessive torsional stiffness of aft mount 205 and to add some lateral tuning capabilities. Links 213a and 213b have longitudinal axes 216a and 216b, respectively, that intersect at a focal point C which is on the longitudinal center line 218 of engine 207. This arrangement makes aft mount 205 statically determinate. Link 213c is necessary for torque sharing, because forward mount 203 is not sufficiently tunable or strong. Because link 213c is necessary for torque sharing, it also counteracts the induced torque from the rotor that is transferred back through the engine 207 and into the pylon assembly.

Figure 4:
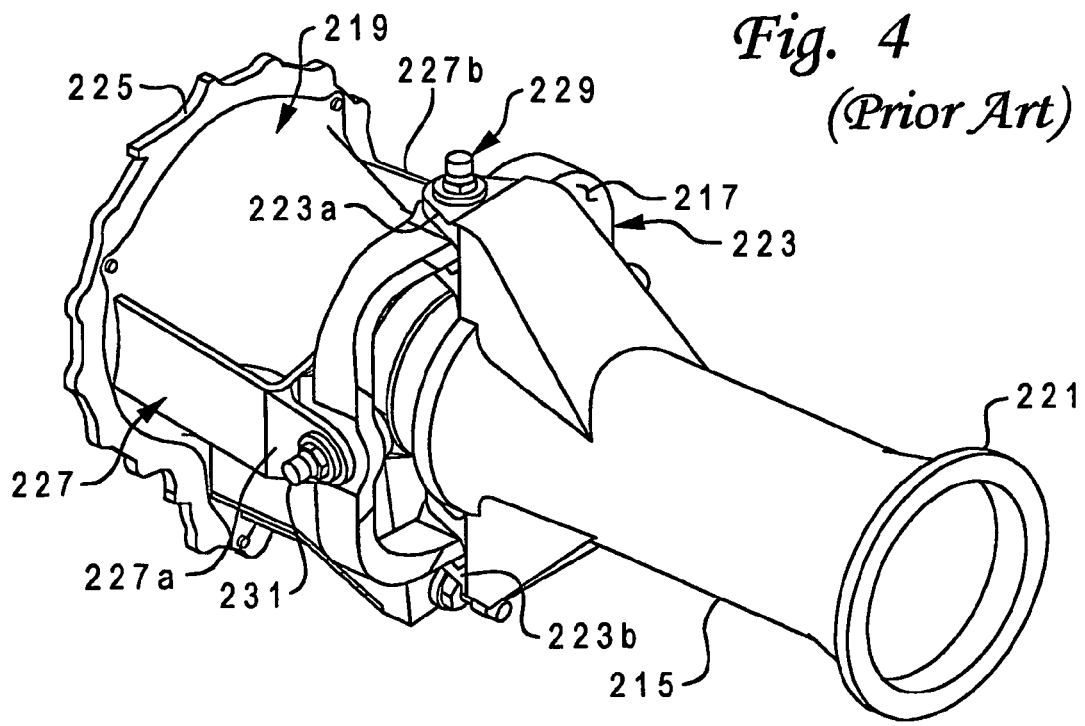
FIG. 4 is a perspective view of the forward mount of the prior-art engine mount system of FIG. 3.
Figure 5:
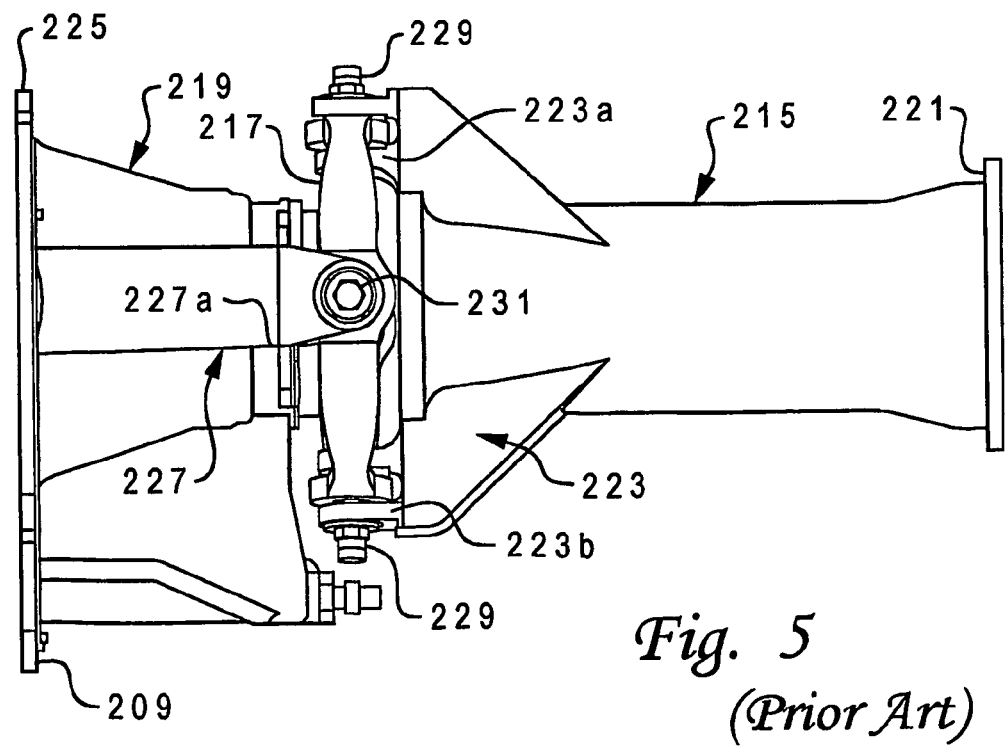
FIG. 5 is a side view of the forward mount of FIG. 4.

Referring now also to FIGS. 4 and 5 in the drawings, forward mount 203 includes an engine torquemeter housing 215, a gimbal ring 217, and an input quill housing 219. Engine torquemeter housing 215 is typically made of titanium, and includes an attachment flange 221 for coupling to the forward end of engine 207, and a forked end 223 having clevis arms 223a and 223b for coupling to the upper and lower sides of gimbal ring 217. Input quill housing 219 is typically made of stainless steel, and includes an attachment flange 225 for coupling to prop rotor gear box 209 (see FIG. 3), and a forked end 227 having clevis arms 227a and 227b for coupling to the right and left sides of gimbal ring 217. Gimbal ring 217 is typically made of stainless steel, is coupled to clevis arms 223a and 223b of engine torquemeter housing 215 with expandable bolts 229, and is coupled to clevis arms 227a and 227b of input quill housing 219 with expandable bolts 231. Forward mount 203 acts as a universal pin joint, i.e., forward mount 203 counteracts the torque generated by coupling engine 207 to prop rotor gear box 209, but forward mount 203 does not counteract any bending moments. Each forward mount 203, along with associated attachment hardware, typically weighs about 44.6 pounds. With one forward mount 203 on each engine 207, the total weight of forward mounts 203 can be as high as 89.2 pounds per tilt rotor aircraft 11. Each aft mount 205, along with associated attachment hardware, typically weighs about 11.9 pounds. With one aft mount 205 on each engine 207, the total weight of aft mounts 205 can be as high as 23.8 pounds per tilt rotor aircraft 11. Thus, the total weight of this prior-art engine mounting system is about 113 pounds per tilt rotor aircraft 11.

Figure 6:
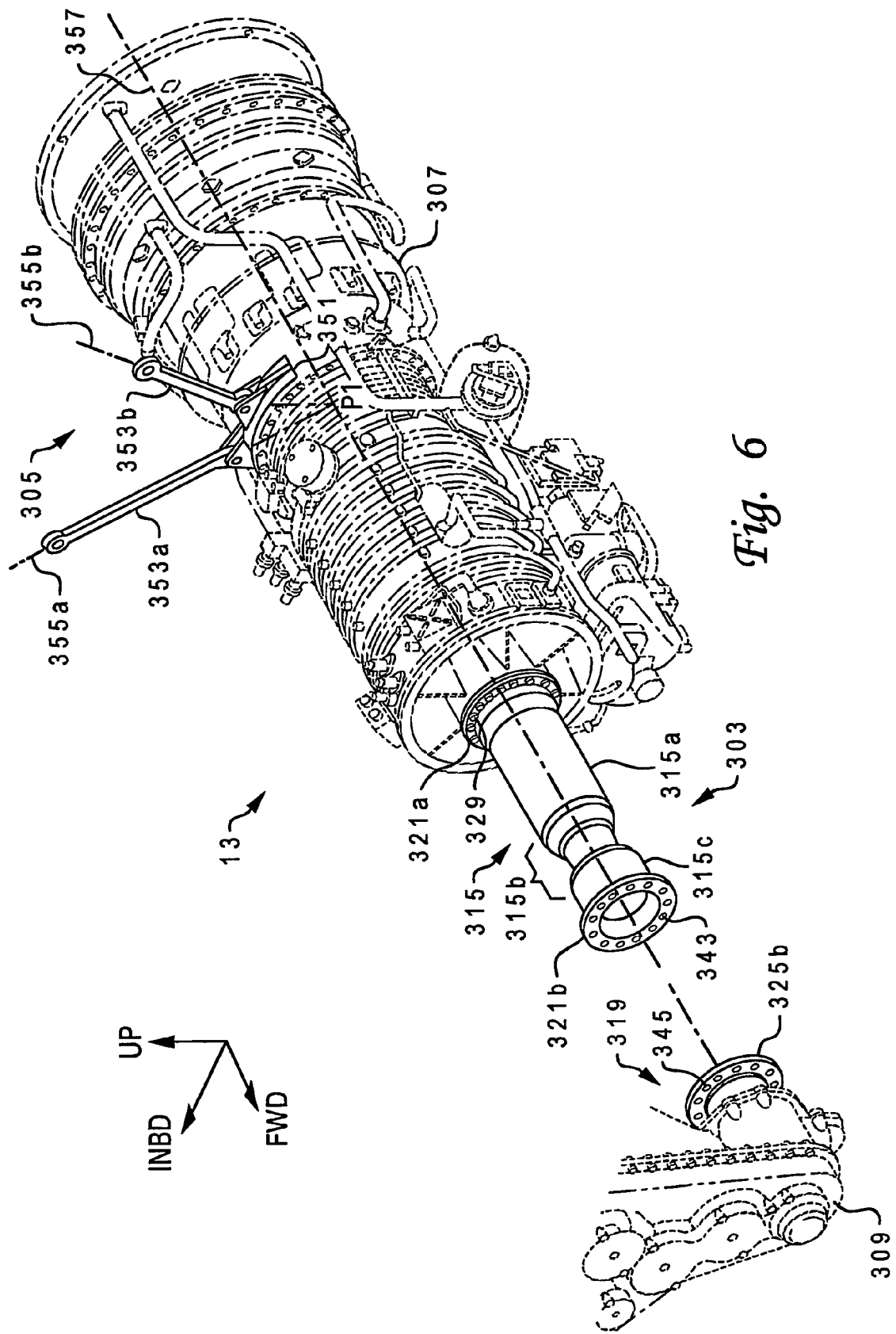
FIG. 6 is a perspective view of the torsionally de-coupled engine mount system of the military-type tilt rotor aircraft of FIG. 1.
Figure 7:
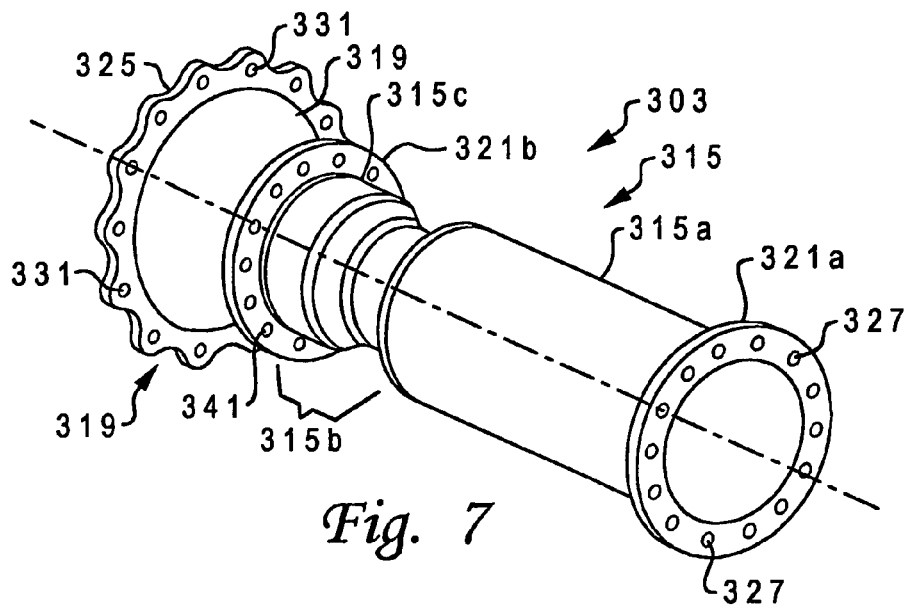
FIG. 7 is a perspective view of the forward mount of the engine mount system of FIG. 6.

Referring now to FIGS. 6-9 in the drawings, the preferred embodiment of the torsionally de-coupled engine mount system 13 for military-type tilt rotor aircraft 11 of FIG. 1, is illustrated. System 13 as shown in FIG. 6 is for the left-hand tilt rotor assembly 15b. System 13 includes a forward mount 303 and a dual link aft mount 305. System 13 is a means of mounting a conventional engine 307 to a conventional prop rotor gear box 309 and a conventional pylon assembly (not shown, but similar to pylon assembly 410 in FIG. 9). A mechanical engine-pylon loop is formed by coupling the forward end of engine 307 to prop rotor gear box 309, by coupling prop rotor gear box 309 to the forward end pylon assembly, and by coupling the aft end of the pylon assembly to the aft end of engine 307. If not for the torsional de-coupling of the present invention, rotor torque from main rotor 23b would be induced into engine 307 via the engine-pylon loop.

Forward mount 303 is preferably chalice-shaped and made of aluminum. Forward mount 303 includes an elongated annular base portion 315a, an annular flexure region 315b having a reduced diameter, and an annular top portion 315c. Base portion 315a terminates with an attachment flange 321a for coupling forward mount 303 to the forward end of an engine 307. Attachment flange 321a includes a plurality of spaced mounting apertures 327 which receive bolts 329 for securing base portion 315a to engine 307. In the preferred embodiment, base portion 315a is elongated to house a conventional engine torquemeter. As will be explained in detail below, the length of base portion 315a may vary depending upon the application in which forward mount 303 is used.

Top portion 315c of forward mount 303 terminates with an attachment flange 321b for attachment to an input quill housing 319 of prop rotor gear box 309. Attachment flange 321b includes a plurality of spaced mounting apertures 343 which receive bolts 341 for securing top portion 315c to input quill housing 319. Input quill housing 319 serves as an adapter coupling with which forward mount 303 can be coupled to prop rotor gear box 309 or any other prop rotor gear box or transmission. Input quill housing 319 is preferably made of aluminum, and includes a generally frusto-conical base portion 319a and an end portion 319b.

Base portion 319a of input quill housing 319 terminates with an attachment flange 325a for coupling to prop rotor gear box 309. Attachment flange 325a includes a plurality of spaced mounting apertures 331 which receive bolts (not shown) for securing base portion 319a to prop rotor gear box 309. End portion 319b terminates with an attachment flange 325b for coupling to end portion 315c of forward mount 303. Attachment flange 325b includes a plurality of spaced mounting apertures 345 which receive bolts 341 for securing end portion 319b to top portion 315c of forward mount 303. Thus, forward mount 303 and input quill housing 319 are coupled together at attachment flanges 321b and 325b with bolts 341 that pass through mounting apertures 343 and 345, respectively.

Figure 8:
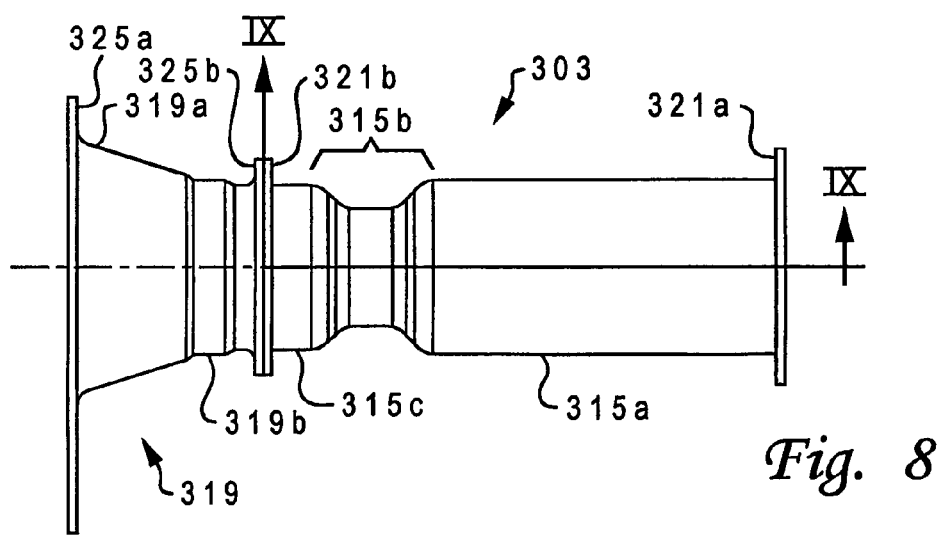
FIG. 8 is a side view of the forward mount of FIG. 7.
Figure 9:
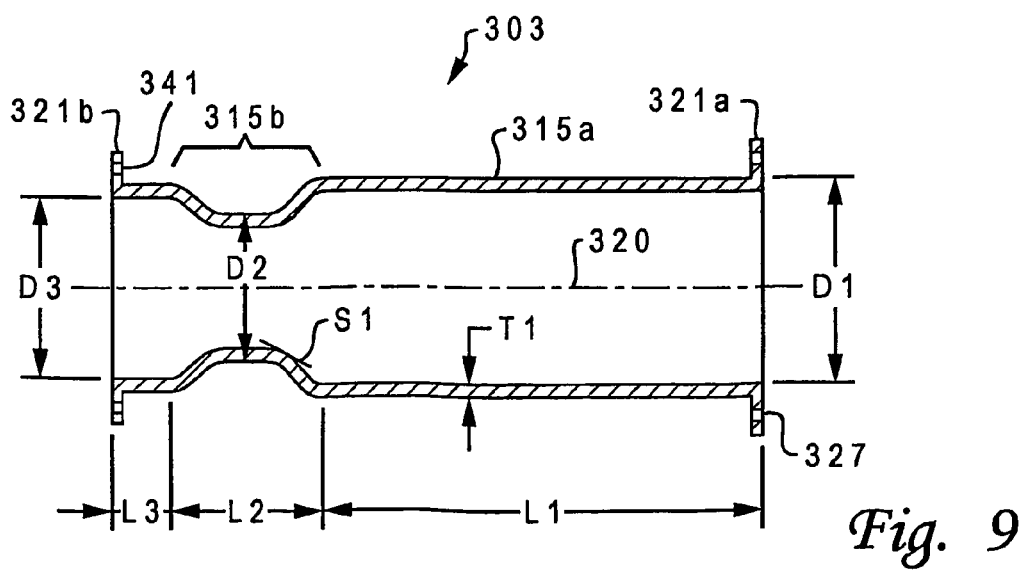
FIG. 9 is a cross-sectional view of the forward mount of FIG. 6 taken at IX-IX in FIG. 8.

In FIG. 9, forward mount 303 is illustrated in a cross-sectional view taken at IX-IX in FIG. 8. As is shown, forward mount 303 is preferably hollow and chalice-shaped, having a wall thickness T1. Base portion 315a has a longitudinal length L1, flexure region 315b has a longitudinal length L2, and end portion 315c has a longitudinal length L3. In addition, base portion 315a has an outside diameter of D1 and end portion 315c has an outside diameter of D3. Because flexure region 315b tapers radially inwardly along a longitudinal axis 320, flexure region 315b has an outside diameter D2 and a slope S1 that vary over the length L2 of flexure region 315b. It should be understood that T1, L1, L2, L3, D1, D2, D3, and S1 may be either constant or may be varied over certain ranges or lengths. By altering the values of T1, L1, L2, L3, D1, D2, D3, and S1, or by altering the material of forward mount 303, the dynamic properties of forward mount 303 can be changed.

As shown in FIG. 6, aft mount 305 includes a mounting bracket 351 and links 353a and 353b. Mounting bracket 351 and links 353a and 353b are preferably made of steel. Although aft mount 305 may be mounted to engine 307 at any number of locations, it is preferred that mounting bracket 351 is coupled to the upper side of aft portion of engine 307. Links 353a and 353b are each pivotally coupled between mounting bracket 351 and a pylon assembly (not shown, but similar to pylon assembly 410 in FIG. 9). Links 353a and 353b have longitudinal axes 355a and 355b, respectively, that intersect at a focal point P1 which is preferably located on a longitudinal axis 357 of engine 307. Because the induced torque from rotor 23b (see FIG. 1) can only be transferred back through engine 307 into the pylon assembly through links 353a and 353b, and because links 353a and 353b have a focal point P1 that lies on longitudinal axis 357, the induced torque from rotor 23b is eliminated and has no effect on the engine torque of engine 307. This configuration ensures that no portion of the torque from rotor 23b is induced into engine 307 via the engine-pylon loop.

Aft mount 305 counteracts only vertical and lateral forces acting at longitudinal axis 357. Aft mount 305 does not counteract any torque about longitudinal axis 357 or any bending forces about any lateral axes or any longitudinal forces acting on engine 307, such as forces generated by engine thermal growth. As such, the portion of the torque from rotor 123b which would be induced into the engine-pylon loop is de-coupled from engine 307, without the need for complicated and heavy components, such as complicated tuning links. However, forward mount 303 still functions to counteract torque applied to the transmission by the engine input shaft.

In operation, forward mount 303 counteracts forces in all six degrees of freedom, i.e., all vertical, longitudinal, and lateral forces, and all bending moments about the vertical, longitudinal, and lateral axes. According to the present invention, the size, shape, weight, and other physical properties of forward mount 303 are selectively tailored to tune the contribution of engine 307 to the dynamic response of the entire aircraft 11. In particular, the size, shape, and material of flexure region 315b is selectively tailored by altering T1, D2, and S1 to produce a desired dynamic response. In this manner, the contribution of engine 307 to the dynamic response of the entire aircraft 11 can be dynamically tuned without the need for heavy, complicated gimbal systems, such as those shown in FIGS. 3-5.

In the preferred embodiment of the present invention for the military-type tilt rotor aircraft of FIG. 1, each forward mount 303, along with its associated attachment hardware, weighs about 16.0 pounds. With one forward mount 303 on each engine 307, the total weight of forward mounts 303 is only about 32.0 pounds per aircraft 11. In the preferred embodiment, aft mount 305, along with its associated attachment hardware, weighs about 6.0 pounds. With one aft mount 305 on each engine 307, the total weight of aft mounts 305 is only about 12.0 pounds per aircraft 11. Thus, the total weight of torsionally de-coupled engine mount system 13 is only about 44.0 pounds per aircraft 11. This represents a weight saving of about 69.0 pounds per aircraft, or about 61%, over the prior-art engine mounting system of FIGS. 3-5 described above.

Referring now to FIGS. 10-15 in the drawings, the preferred embodiment of the torsionally de-coupled engine mount system 113 according to the present invention for the civilian-type tilt rotor aircraft 111 of FIG. 2, is illustrated. System 113 as shown in FIG. 10 is for the left hand tilt rotor assembly 115b. System 113 includes a chalice-shaped forward mount 403 and a bi-pod triangular-shaped aft mount 405. System 113 is a means of mounting a conventional engine 407 to a conventional prop rotor gear box 409 and a conventional pylon assembly 410. Engine torque from engine 407 is transferred through prop rotor gear box 409 to a drive shaft 416 which drives rotor 123b.

Forward mount 403 is preferably made of aluminum, and includes a base portion 415, an integral flexure region 423, and an input quill housing 419. Base portion 415 transitions into input quill housing 419 at flexure region 423. Base portion 415 terminates with an attachment flange 421 for coupling to the forward end of engine 407. Attachment flange 421 includes a plurality of spaced mounting apertures 427 which receive bolts 429 for securing forward mount 403 to engine 407. Input quill housing 419 terminates with an attachment flange 425 for coupling to prop 5 rotor gear box 409. Attachment flange 425 includes a plurality of spaced mounting apertures 431 which receive bolts 433 for securing forward mount 403 to prop rotor gear box 409.

Figure 12:
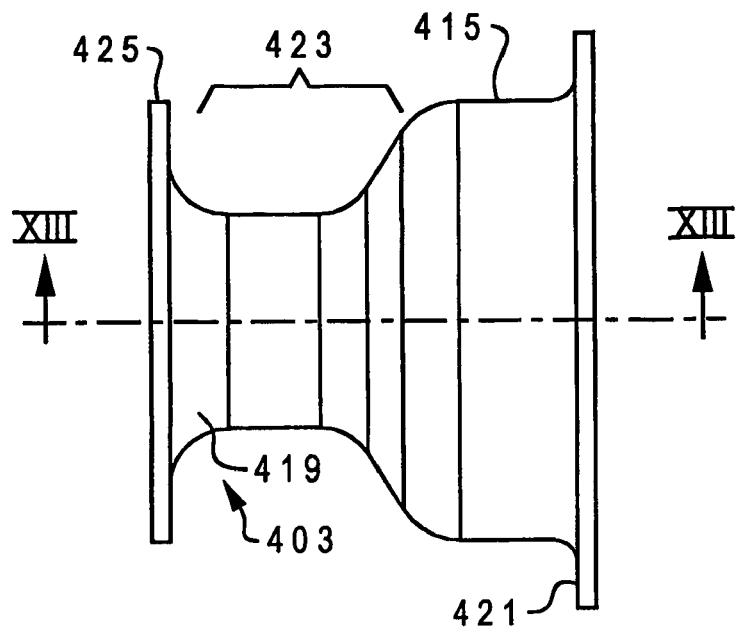
FIG. 12 is a side view of the forward mount of FIG. 11.
Figure 13:
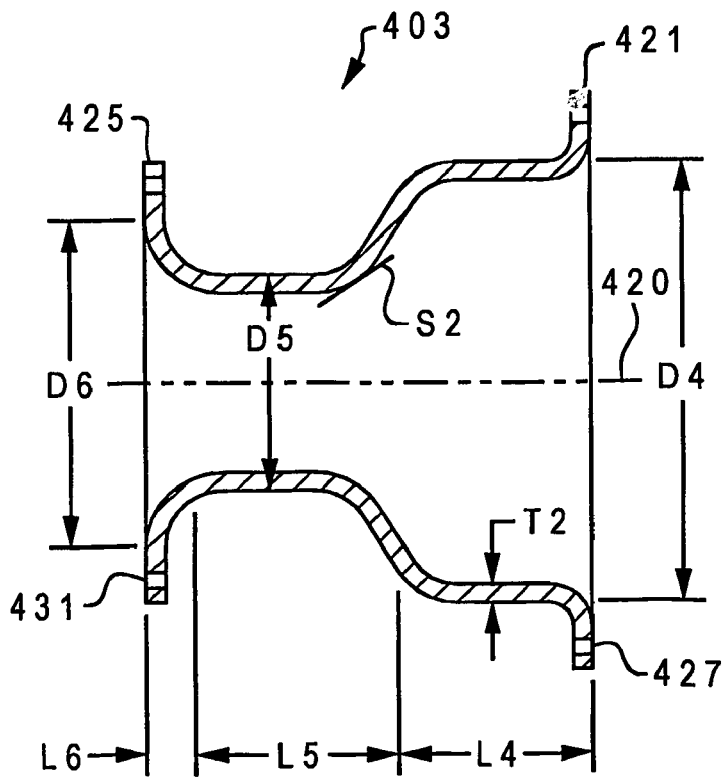
FIG. 13 is a cross-sectional view of the forward mount of FIG. 10 taken at XIII-XIII in FIG. 12.

In FIG. 13, forward mount 403 is illustrated in a cross-sectional view taken at XIII-XIII of FIG. 12. As is shown, forward mount 403 is preferably hollow and chalice-shaped, having a wall thickness T2. Base portion 415 has a longitudinal length L4, flexure region 423 has a longitudinal length L5, and input quill housing 419 has a longitudinal length L6. In addition, base portion 415 has an outside diameter of D4 and input quill housing 423 has an outside diameter of D6. Because flexure region 423 tapers radially inwardly along a longitudinal axis 420, flexure region 423 has an outside diameter D5 and a slope S2 that vary over the length L5 of flexure region 423. It should be understood that T2, L4, L5, L6, D4, D5, D6, and S2 may be either constant or may be varied over certain ranges or lengths. By altering the values of T2, L4, L5, L6, D4, D5, D6, and S2, or by altering the material of forward mount 403, the dynamic properties of forward mount 403 can be changed.

Figure 14:
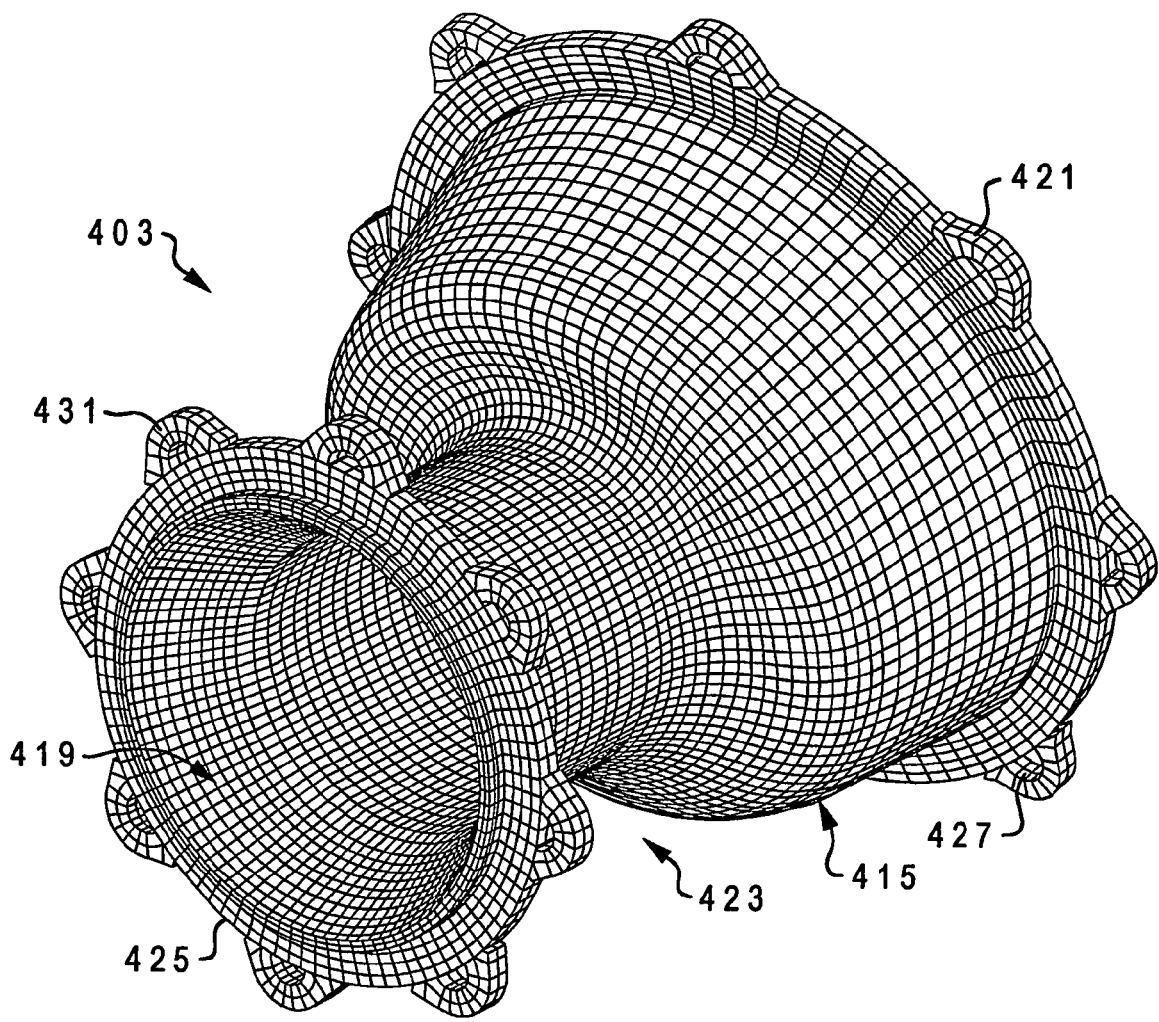
FIG. 14 is an enlarged wire frame perspective view of the forward mount of FIG. 11 in a deflected mode.

In FIG. 14, forward mount 403 is shown in a wire frame perspective view. In this view, forward mount 403 is shown in a deflected mode in which attachment flange 421 of base portion 415 is bent relative to attachment flange 425 of input quill housing 419. As is shown, flexure region 423 deforms by straightening out on the tension side and pinching in on the compression side to accommodate this bending. In this manner, forward mount 403 counteracts forces in all six degrees of freedom, i.e., all vertical, longitudinal, and lateral forces, and all bending moments about the vertical, longitudinal, and lateral axes. According to the present invention, the size, shape, weight, and other physical properties of forward mount 403 are selectively tailored to tune the contribution of engine 407 to the dynamic response of the entire aircraft 111. In particular, the size, shape, and material of flexure region 423 is selectively tailored by altering T2, D5, and S2 to produce a desired dynamic response. In this manner, the contribution of engine 407 to the dynamic response of the entire aircraft 111 can be dynamically tuned without the need for heavy, complicated gimbal systems, such as those shown in FIGS. 3-5.

As shown in FIG. 15, aft mount 405 includes a mounting bracket 451 and two triangular-shaped parallel fittings 453a and 453b. Mounting bracket 451 and fittings 453a and 453b are preferably made of steel. Although aft mount 405 may be mounted to engine 407 at any number of locations, it is preferred that mounting bracket 451 is coupled to the upper side of the aft portion of engine 407. Fittings 453a and 453b are both pivotally coupled to mounting bracket 451 by a pivot pin 461. Fittings 453a and 453b are both pivotally coupled to pylon assembly 410 with bolts 463a and 463b. For fitting 453a, bolts 461 and 463a form a line of action 455a; and bolts 461 and 463b form a line of action 455b. Lines of action 455a and 455b intersect at a focal point P2 which is located above the longitudinal center line 475 of engine 407. In a similar fashion, for fitting 453b, bolts 461 and 463a form a line of action 455c; and bolts 461 and 463b form a line of action 455d. Lines of action 455c and 455d intersect at a focal point P3 which is located above the longitudinal center line 475 of engine 407. Mounting bracket 451 and fittings 453a and 453b form a simple truss that functions like a bi-pod.

Because the induced torque from rotor 123b (see FIG. 2) can only be transferred back through engine 407 into pylon assembly 410 through fittings 453a and 453b, and because fittings 453a and 453b have a focal points P2 and P3 that lie on or above longitudinal axis 475, the induced torque from rotor 123b is eliminated and has no effect on the engine torque of engine 407. Because focal points P2 and P3 are not necessarily located exactly on longitudinal axis 475, a small amount of torque is transferred to engine 407 due to the offset of lateral load on focal points P2 and P3 of aft mount 405 from the engine longitudinal axis 475. However, because the lateral load is comparatively small, this torque is negligible compared to the torque that would be induced into engine 407 without the torsional de-coupling provided by aft mount 405.

Aft mount 405 counteracts only vertical and lateral forces acting at longitudinal axis 475. Aft mount 405 does not counteract any torque acting about longitudinal axis 475 or any bending forces about any lateral axes or any longitudinal forces acting on engine 407, such as forces generated by engine thermal growth. As such, the portion of the torque from rotor 123b which would be induced into the engine-pylon loop is de-coupled from engine 407, without the need for complicated and heavy components, such as complicated tuning links. However, forward mount 403 still functions to counteract torque applied to the transmission by the engine input shaft.

Figure 16A:
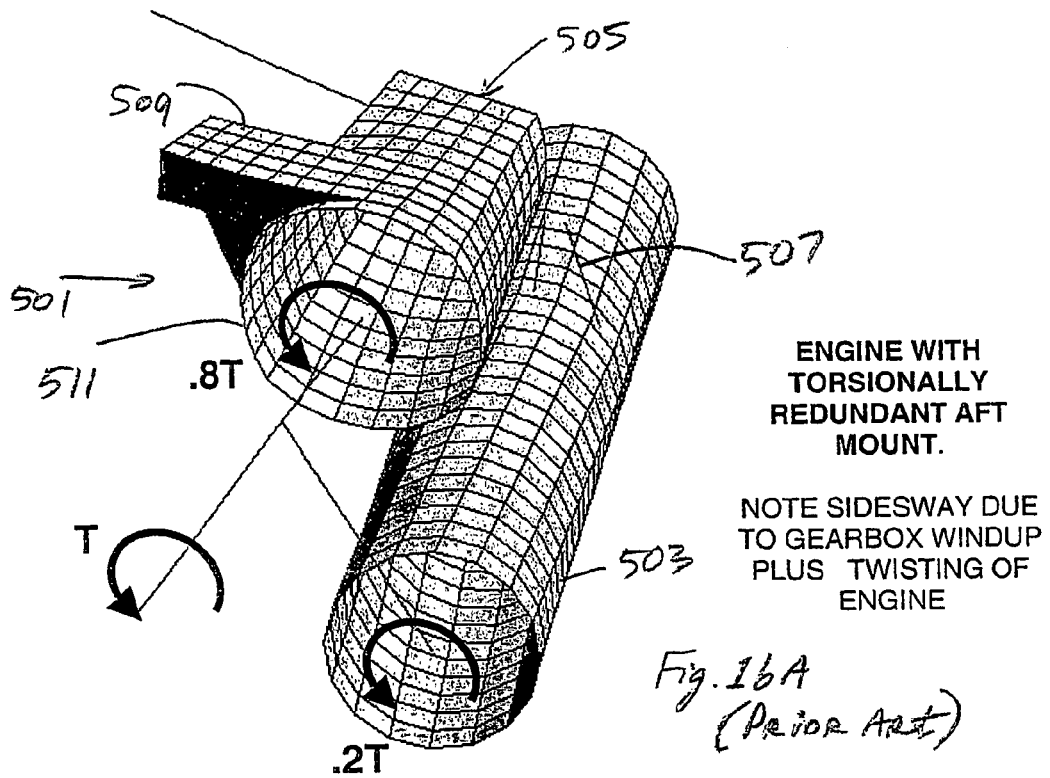
FIGS. 16A and 16B are wire frame schematics comparing the torsionally de-coupled engine mount system according to the present invention with a torsionally redundant engine mount system.
Figure 16B:
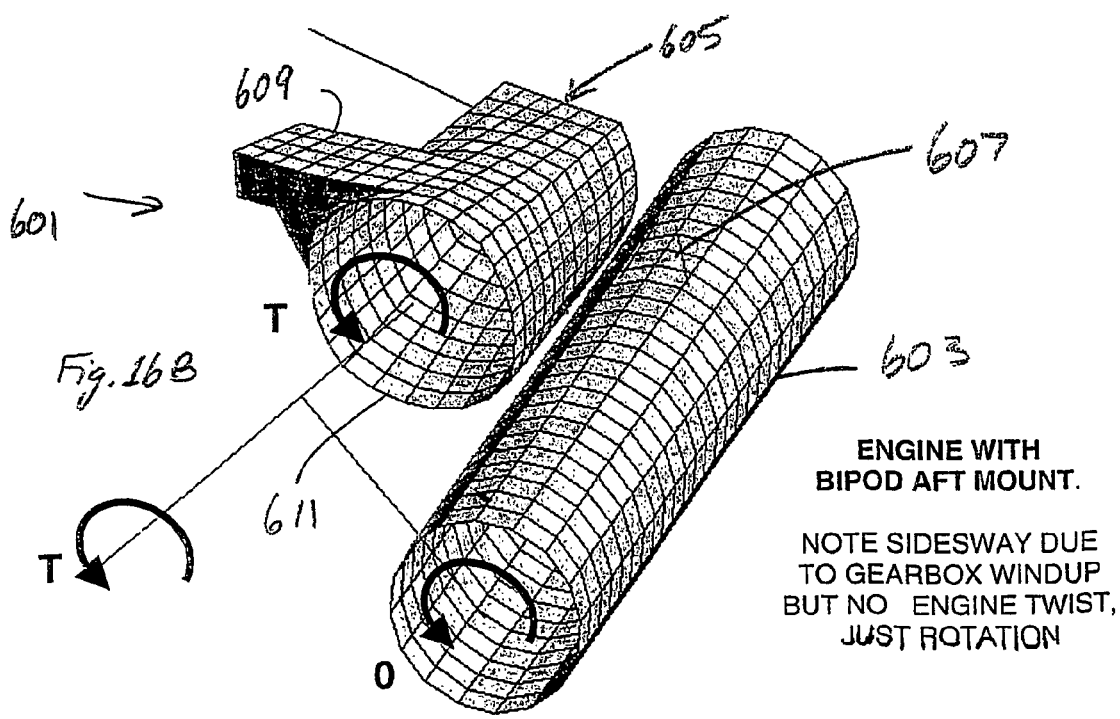

Referring now to FIGS. 16A and 16B in the drawings, the advantages of the torsionally de-coupled engine mount system 13 of the present invention are illustrated. FIGS. 16A and 16B illustrate how the torsionally de-coupled engine mount system of the present invention prevents rotor torque from being induced back into the engine from the engine-pylon loop.

FIG. 16A is a wire frame schematic of a prior-art engine-pylon combination 501 in which an engine 503 is mounted at its forward end to a prop rotor gear box (not shown) by a forward mount (not shown) and at its aft end to a pylon 505 by a torsionally redundant aft mount 507. Pylon 505 includes a spindle 509 that is rigidly installed in the wing of the aircraft (not shown), and a body portion 511 that carries the prop rotor gearbox and engine 503. In this view, the wind-up torque from the prop rotor gear box is represented by arrow T. Wind-up torque T causes spindle 509 to bend upwardly and body portion 511 to rotate upwardly. This rotation causes the forward end of engine 503 to rotate upwardly with the prop rotor gear box. However, because aft engine mount 507 is torsionally redundant and rigidly mounted to pylon 505, the aft end of engine 503 undergoes torsional twisting, which is represented by the curved lines along the longitudinal direction of engine 503. In this configuration, about 80% of the wind-up torque T is passed back into pylon 505, but about 20% of the wind-up torque T, is induced into engine 503. This additional torque on engine 503 is undesirable.

On the other hand, FIG. 16B is a wire frame schematic of an engine-pylon combination 601 for the torsionally de-coupled engine mount system of the present invention in which an engine 603 is mounted at its forward end to a prop rotor gear box (not shown) by a forward mount (not shown) and at its aft end to a pylon 605 by a bi-pod mount 607. Pylon 605 includes a spindle 609 that is rigidly installed in the wing of the aircraft (not shown), and a body portion 611 that carries the prop rotor gearbox and engine 603. As in FIG. 16A, the wind-up torque from the prop rotor gear box is represented by arrow T. Wind-up torque T causes spindle 609 of bend upwardly and body portion 611 to rotate upwardly. This rotation causes the forward end of engine 603 to rotate upwardly with the prop rotor gear box. However, because aft engine mount 607 is a bi-pod, the aft end of engine 603 does not undergo any torsional twisting. Thus, the lines along the longitudinal direction of engine 603 are straight. By using the torsionally de-coupled engine mount system of the present invention, all of the wind-up torque T is passed back into pylon 605, and none of the wind-up torque T is induced into engine 603. This results in considerable cost and weight savings. In addition, engine 603 does not have to be unnecessarily over-designed to accommodate induced torque from the rotor.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. An engine mounting system for use in rotorcraft having a rotor, a pylon assembly, a transmission coupled to the pylon assembly, and an engine, the engine mounting system comprising:

a forward mount for coupling the engine to the transmission, the forward mount having selected physical characteristics and comprising:
an annular base portion configured for coupling to the engine, the annual base portion having a first outside diameter;
an annular top portion configured for coupling to the transmission; and
an annular flexure region disposed between the annular base portion and the annular top portion, the annular flexure region comprising:
a first part having a second outside diameter that is less than the first outside diameter; and
a second part forming a transition in outside diameter between the second outside diameter and the first outside diameter; and
an aft mount for coupling the engine to the pylon assembly;
wherein the forward mount is configured, such that a contribution from the engine to the dynamic response of the engine mounting system is determined by a selected physical characteristics of the flexure region;
wherein the aft mount comprises:
a bipod disposed in a plane generally transverse to the longitudinal axis of the engine;
wherein the aft mount is configured to avoid reaction of torque, such that only the forward mount reacts torque, thereby eliminating torsional redundancy in the engine mounting system, so as to thereby prevent torque from the rotor from being induced into the engine by the aft mount.

2. The engine mounting system according to claim 1, wherein the forward mount defines a housing for an engine torquemeter.

3. The engine mounting system according to claim 1, wherein the annular flexure region further comprises:
a selected slope in the second part forming the transition between the first and second outside diameters; and
a wall thickness of the annular forward mount.

4. The engine mounting system according to claim 1, wherein the aft mount further comprises:
at least one pylon mounting bracket disposed on the pylon assembly;
at least one engine mounting bracket disposed on the engine;
wherein the bipod comprises:
two rigid links, each link being pivotally coupled to the pylon mounting bracket, such that the links form a focal point located near the longitudinal axis of the engine.

5. The engine mounting system according to claim 1, wherein the aft mount is attached to the pylon assembly at two points and pivotally attached to the engine at one point.

* * * * *

UNITED STATES PATENT AND TRADEMARK OFFICE
CERTIFICATE OF CORRECTION

PATENT NO. : 7,594,623 B2 Page 1 of 1
APPLICATION NO. : 10/528213
DATED : September 29, 2009
INVENTOR(S) : Howard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 808 days.

Signed and Sealed this

Twenty-eighth Day of September, 2010

David J. Kappos
*Director of the United States Patent and Trademark Office*